(12) United States Patent
Ishida et al.

(10) Patent No.: US 7,520,405 B2
(45) Date of Patent: Apr. 21, 2009

(54) CUP HOLDER

(75) Inventors: Tomohiro Ishida, Aichi-ken (JP);
Makoto Okada, Aichi-ken (JP);
Katsuhiro Katagiri, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 334 days.

(21) Appl. No.: 11/600,773

(22) Filed: Nov. 17, 2006

(65) Prior Publication Data

US 2007/0119855 A1 May 31, 2007

(30) Foreign Application Priority Data

Nov. 28, 2005 (JP) ............................. 2005-342447

(51) Int. Cl.
*B65D 25/00* (2006.01)
(52) U.S. Cl. ..................... 220/737; 248/311.2
(58) Field of Classification Search .................. 220/737; 224/926; 248/311.2
See application file for complete search history.

(56) References Cited

U.S. PATENT DOCUMENTS 6,817,584 B2   11/2004   Ogura
7,380,762 B2 *  6/2008   Takeichi ................. 248/311.2
2005/0205590 A1 * 9/2005  Bastian et al. ............. 220/737

FOREIGN PATENT DOCUMENTS

| DE | 10102559 A1 * | 8/2002 |
|---|---|---|
| JP | A-11-348641 | 12/1999 |
| JP | 2002-029304 | 1/2002 |

* cited by examiner

*Primary Examiner*—Anthony E. Stashick
*Assistant Examiner*—Harry A Grosso
(74) *Attorney, Agent, or Firm*—Posz Law Group, PLC

(57) ABSTRACT

A cup holder includes a holder body, an inner-peripheral-side supporting member, a first urging member, an outer-peripheral-side supporting member, and a second urging member. The holder body has an accommodation portion. The first urging member urges the inner-peripheral-side supporting member rotatably upward to a first datum position. The second urging member urges the outer-peripheral-side supporting member rotatably upward to a second datum position. The first rotary shaft-center of the inner-peripheral-side supporting member, which is located at the first datum position, being disposed at a position, which is displaced by a predetermined magnitude toward an imaginary center of the accommodation portion of the holder body with respect to the second rotary shaft-center of the outer-peripheral-side supporting member, which is located at the second datum position.

7 Claims, 5 Drawing Sheets

CUP HOLDER

BACKGROUND OF THE INVENTION

1. Field of the Invention

The present invention relates to a cup holder, which is disposed inside automobile passenger rooms. In particular, it relates to a cup holder, which can stably hold each of containers whose diameters differ with each other.

2. Description of the Related Art

Cup holders have been used widely in order to hold beverage containers stably in automobiles. However, since beverage containers have various sizes, a variety of devices have been invented in order to hold them stably.

For example, as disclosed in Japanese Patent Gazette No. 3,283,009, a cup holder has been known conventionally. The conventional cup holder comprises a holder body, an outer-peripheral-side supporting member, and an inner-peripheral-side supporting member. The holder body has an accommodation portion into which a container is fitted. The outer-peripheral-side supporting member and the inner-peripheral-side supporting member are installed to the holder body, and are urged rotatably in such a direction that they protrude within the accommodation portion of the holder body.

In the conventional cup holder, the outer-peripheral-side supporting member and inner-peripheral-side supporting member are disposed rotatably about a shared rotary shaft-center, respectively, and are urged upward by an urging member to their datum positions at which they protrude horizontally within the accommodation portion of the holder body by a predetermined magnitude, respectively. Moreover, the outer-peripheral-side supporting member and the inner-peripheral-side supporting member have a holding surface, which is capable of contacting with and then holding a side face of a container, at the front end, respectively. In addition, the inner-peripheral-side supporting member has a length which is longer than that of the outer-peripheral-side supporting member. Consequently, when the outer-peripheral-side supporting member and the inner-peripheral-side supporting member are located at their own datum positions, the holding surface of the inner-peripheral-side supporting member is disposed farther away from the shared rotary shaft-center than the holding surface of the outer-peripheral-side supporting member is disposed.

When the conventional cup holder holds a minor-diameter container, the holding surface of the inner-peripheral-side support member, which is located at the datum position, and an inner wall surface of the holder body's accommodation portion support an upper side surface of the minor-diameter container. Moreover, when the conventional cup holder holds an intermediate-diameter container, the holding surface of the outer-peripheral-side support member, which is located at the datum position, and the inner wall surface of the holder body's accommodation portion support an upper side face of the intermediate-diameter container; and additionally the inner-peripheral-side supporting member, which is rotated downward by being pressed with the intermediate-diameter container as the intermediate-diameter container is fitted into the holder body's accommodation portion, supports a lower side face of the intermediate-diameter container. In addition, when the conventional cup holder holds a major-diameter container, the inner wall surface of the holder body's accommodation portion supports an upper side face of the major-diameter container; and additionally the outer-peripheral-side support member and the inner-peripheral-side supporting member, which are rotated downward by being pressed with the major-diameter container as the major-diameter container is fitted into the holder body's accommodation portion, support a lower side face of the major-diameter container.

However, intermediate-diameter containers have various configurations. For example, some intermediate-diameter containers are provided with irregularities, which extend in the peripheral direction, at the lower portion.

When the conventional cup holder, which comprises the outer-peripheral-side supporting member and the inner-peripheral-side supporting member disposed rotatably about a shared rotary shaft-center, holds an intermediate-diameter container, which is provided with such an irregularity, the inner-peripheral-side supporting member gets stuck with the irregularity of the intermediate-diameter container so that there might occur such an instance that the intermediate-diameter container has been less likely to be pulled out of the conventional cup holder.

SUMMARY OF THE INVENTION

The present invention has been developed in view of the aforementioned circumstances. It is therefore an object of the present invention to provide a cup holder, which can stably hold each of containers whose diameters differ with each other, and additionally in which containers, being provided with peripherally-extending irregularities, are inhibited from being less likely to be pulled out of the cup holder.

A cup holder according to the present invention solves the aforementioned problem, and comprises:

- a holder body having an accommodation portion into which a container is fitted;
- an inner-peripheral-side supporting member disposed rotatably within the accommodation portion of the holder body, and having a first rotary shaft-center, a base end, an inner-peripheral-side supporting portion, and a leading end, the base end being supported pivotally so as to be rotatable about the first rotary shaft-center, the inner-peripheral-side supporting portion being capable of supporting a minor-diameter container when contacting with a side face of the minor-diameter container, the leading end being provided with the inner-peripheral-side supporting portion;
- a first urging member for urging the inner-peripheral-side supporting member rotatably upward to a first datum position, at which the inner-peripheral-side supporting portion of the inner-peripheral-side supporting member protrudes by a first predetermined magnitude within the accommodation portion of the holder body, in such a direction that the inner-peripheral-side supporting member protrudes within the accommodation portion;
- an outer-peripheral-side supporting member disposed rotatably within the accommodation portion of the holder body, and having a second rotary shaft-center, a base end, an outer-peripheral-side supporting portion, and a leading end, the base end being supported pivotally so as to be rotatable about the second rotary shaft-center, the outer-peripheral-side supporting portion being capable of supporting an intermediate-diameter container, whose diameter is larger that of the minor-diameter container, when contacting with a side face of the intermediate-diameter container, the leading end being provided with the outer-peripheral-side supporting portion; and
- a second urging member for urging the outer-peripheral-side supporting member rotatably upward to a second datum position, at which the outer-peripheral-side supporting portion of the outer-peripheral-side supporting member protrudes by a second predetermined magnitude within the accommodation portion of the holder body, in such a direction that the outer-peripheral-side supporting member protrudes within the accommodation portion;

the first rotary shaft-center of the inner-peripheral-side supporting member, which is located at the first datum position, being disposed at a position, which is displaced by a predetermined magnitude toward an imaginary center of the accommodation portion of the holder body with respect to the second rotary shaft-center of the outer-peripheral-side supporting member, which is located at the second datum position.

In the present cup holder, the first rotary shaft-center of the inner-peripheral-side supporting member, which is located at the fist datum position, is disposed at a position, which is displaced by a predetermined magnitude toward an imaginary center of the accommodation portion of the holder body with respect to the second rotary shaft-center of the outer-peripheral-side supporting member, which is located at the second datum position. On the other hand, the conventional cup holder comprises an outer-peripheral-side supporting member and an inner-peripheral-side supporting member, which are disposed rotatably about a shared rotary shaft-center. The inner-peripheral-side supporting member of the conventional cup holder will be hereinafter referred to as a "conventional inner-peripheral-side supporting member." That is, although, in the present cup holder, the inner-peripheral-side supporting portion of the inner-peripheral-side supporting member, which is located at the first datum position, is disposed at the same position as the conventional inner-peripheral-side member is disposed within the accommodation portion of the holder body, the inner-peripheral-side supporting member of the present cup holder has a shorter rotary radius than that of the conventional inner-peripheral-side supporting member. Accordingly, when the present cup holder's inner-peripheral-side supporting member is pressed by an intermediate-diameter container as the intermediate-diameter container is fitted into the accommodation portion so that the inner-peripheral-side supporting member rotates downward from the first datum position, the present cup holder's inner-peripheral-side supporting member rotates by a greater rotary angle than the conventional inner-peripheral-side supporting member does. In other words, the present cup holder's inner-peripheral-side supporting member moves by a greater rotary magnitude that the conventional inner-peripheral-side supporting member does, and exhibits a reduced relief angle θ, an angle formed between the vertical line passing through the inner-peripheral-side supporting member's first rotary shaft-center and the downwardly-rotated inner-peripheral-side supporting member, which is less than the conventional inner-peripheral-side supporting member exhibits. Consequently, even when the present cup holder holds intermediate-diameter containers, whose lower portion is provided with peripherally-extending irregularities, the inner-peripheral-side supporting member are less likely to get stuck with the irregularities, that is, the irregularities are likely to get away from the inner-peripheral-side supporting member. As a result, it is possible to inhibit the intermediate-diameter containers from being less likely to be pulled out of the present cup holder.

In the present cup holder according to a first preferred mode, the inner-peripheral-side supporting portion of the inner-peripheral-side supporting member, which is located at the first datum position, is positioned nearer to the imaginary center of the accommodation portion of the holder body than the outer-peripheral-side supporting portion of the outer-peripheral-side supporting member, which is located at the second datum position, is positioned;

when holding the minor-diameter container, the inner-peripheral-side supporting portion of the inner-peripheral-side supporting member, which is located at the first datum position, and an inner wall surface of the accommodation portion of the holder body contact with the side face of the minor-diameter container, which is fitted into the accommodation portion, to support the minor-diameter container; and when holding the intermediate-diameter container, the inner-peripheral-side supporting member, which is rotated downward from the first datum position by being pressed with the intermediate-diameter container as the intermediate-diameter container is fitted into the accommodation portion of the holder body, the outer-peripheral-side supporting portion of the outer-peripheral-side supporting member, which is located at the second datum position, and the inner wall surface of the accommodation portion of the holder body contact with the side face of the intermediate-diameter container, which is fitted into the accommodation portion, to support the intermediate-diameter container.

When the present cup holder according to the first preferred mode holds the minor-diameter container, it can support the minor-diameter container with the inner-peripheral-side supporting portion of the inner-peripheral-side supporting member, which is located at the first datum position, and an inner wall surface of the accommodation portion of the holder body. Moreover, when the present cup holder according to the first preferred mode holds the intermediate-diameter container, it can support the intermediate-diameter container with the inner-peripheral-side supporting member, which is rotated downward from the first datum position by being pressed with the intermediate-diameter container as the intermediate-diameter container is fitted into the accommodation portion of the holder body, the outer-peripheral-side supporting portion of the outer-peripheral-side supporting member, which is located at the second datum position, and the inner wall surface of the accommodation portion of the holder body. As a result, the present cup holder according to the first preferred mode can hold not only the minor-diameter container but also the intermediate-diameter container stably.

In the present cup holder according to a second preferred mode, the outer-peripheral-side supporting member is supported pivotally to the holder body while interposing the second urging member therebetween; and the inner-peripheral-side supporting member is supported pivotally to the outer-peripheral-side supporting member while interposing the first urging member therebetween.

The present cup holder according to the second preferred mode comprises the outer-peripheral-side supporting member, which is supported pivotally to the holder body while interposing the second urging member therebetween, and the inner-peripheral-side supporting member, which is supported pivotally to the outer-peripheral-side supporting member while interposing the first urging member therebetween. Accordingly, the present cup holder according to the second preferred mode can make the first urging member's urging force equal to the second urging member's urging force to each other. Consequently, the present cup holder according to the second preferred mode can make the load for operating the outer-peripheral-side supporting member equal to the load for operating the inner-peripheral-side supporting member.

In the present cup holder according to a third preferred mode, the outer-peripheral-side supporting portion of the outer-peripheral-side supporting member has an arc-shaped outer-peripheral-side supporting inner-end surface, which conforms to an outer-peripheral configuration of the intermediate-diameter container substantially;

the inner-peripheral-side supporting portion of the inner-peripheral-side supporting member has an arc-shaped inner-peripheral-side supporting inner-end surface, which conforms to an outer-peripheral configuration of the minor-diameter container substantially, and an arc-shaped outer-end surface, which conforms to the arc-shaped outer-peripheral-side supporting inner-end surface of the outer-peripheral-side supporting portion substantially; and the outer-peripheral-side supporting member further has an accommodation dent, which is capable of accommodating the base end of the inner-peripheral-side supporting member therein.

The present cup holder according to the third preferred mode comprises the outer-peripheral-side supporting member whose outer-peripheral-side supporting portion has an arc-shaped outer-peripheral-side supporting inner-end surface, which conforms to an outer-peripheral configuration of the intermediate-diameter container substantially; and the inner-peripheral-side supporting member whose inner-peripheral-side supporting portion has an arc-shaped inner-peripheral-side supporting inner-end surface, which conforms to an outer-peripheral configuration of the minor-diameter container substantially. Therefore, when the present cup holder according to the third preferred mode holds the intermediate-diameter container, it can support the side face of the intermediate-diameter container securely with the arc-shaped outer-peripheral-side supporting inner-end surface of the outer-peripheral-side supporting member's outer-peripheral-side supporting portion. Moreover, when the present cup holder according to the third preferred mode holds the minor-diameter container, it can support the side face of the minor-diameter container securely with the arc-shaped inner-peripheral-side supporting inner-end surface of the inner-peripheral-side supporting member's inner-peripheral-side supporting portion.

In addition, in the present cup holder according to the third preferred mode, the outer-peripheral-side supporting member further has an accommodation dent, which is capable of accommodating the base end of the inner-peripheral-side supporting member therein; and the inner-peripheral-side supporting member's inner-peripheral-side supporting portion has an arc-shaped outer-end surface, which conforms to the arc-shaped supporting inner-end surface of the outer-peripheral-side supporting member's outer-peripheral-side supporting portion. Accordingly, it is possible to make the boundary line between the outer-peripheral-side supporting member and the inner-peripheral-side supporting member a clear-cut arc shape. Consequently, the present cup holder according to the third preferred mode exhibits upgraded decorativeness.

In the present cup holder according to a fourth preferred mode, when holding a major-diameter container, whose diameter is larger than that of the intermediate-diameter container, the inner-peripheral-side supporting member, which is rotated downward from the first datum position by being pressed with the major-diameter container as the major-diameter container is fitted into the accommodation portion of the holder body, the outer-peripheral-side supporting member, which is rotated downward from the second datum position by being pressed with the major-diameter container as the major-diameter container is fitted into the accommodation portion of the holder body, and the inner wall surface of the accommodation portion of the holder body contact with a side face of the major-diameter container, which is fitted into the accommodation portion, to support the major-diameter container.

When the present cup holder according to the fourth preferred mode holds the major-diameter container, it can support the major-diameter container with the inner-peripheral-side supporting member, which is rotated downward from the first datum position by being pressed with the major-diameter container as the major-diameter container is fitted into the accommodation portion of the holder body, the outer-peripheral-side supporting member, which is rotated downward from the second datum position by being pressed with the major-diameter container as the major-diameter container is fitted into the accommodation portion of the holder body, and the inner wall surface of the holder body's accommodation portion.

All in all, the present cup holder can stably hold each of containers whose diameters differ with each other. Moreover, even when the present cup holder holds containers, which are provided with peripherally-extending irregularities at the lower portion, the inner-peripheral-side supporting member is less likely to get stuck with the peripherally-extending irregularities, or the peripherally-extending irregularities are likely to get away from the inner-peripheral-side supporting member. As a result, the present cup holder can inhibit the containers from being less likely to be pulled out of the present cup holder.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

EXAMPLE

Hereinafter, a cup holder according to an example of the present invention will be described in detail with reference to the accompanying drawings.

A cup holder according to the present example is held in an automobile console box to use.

Figure 1:
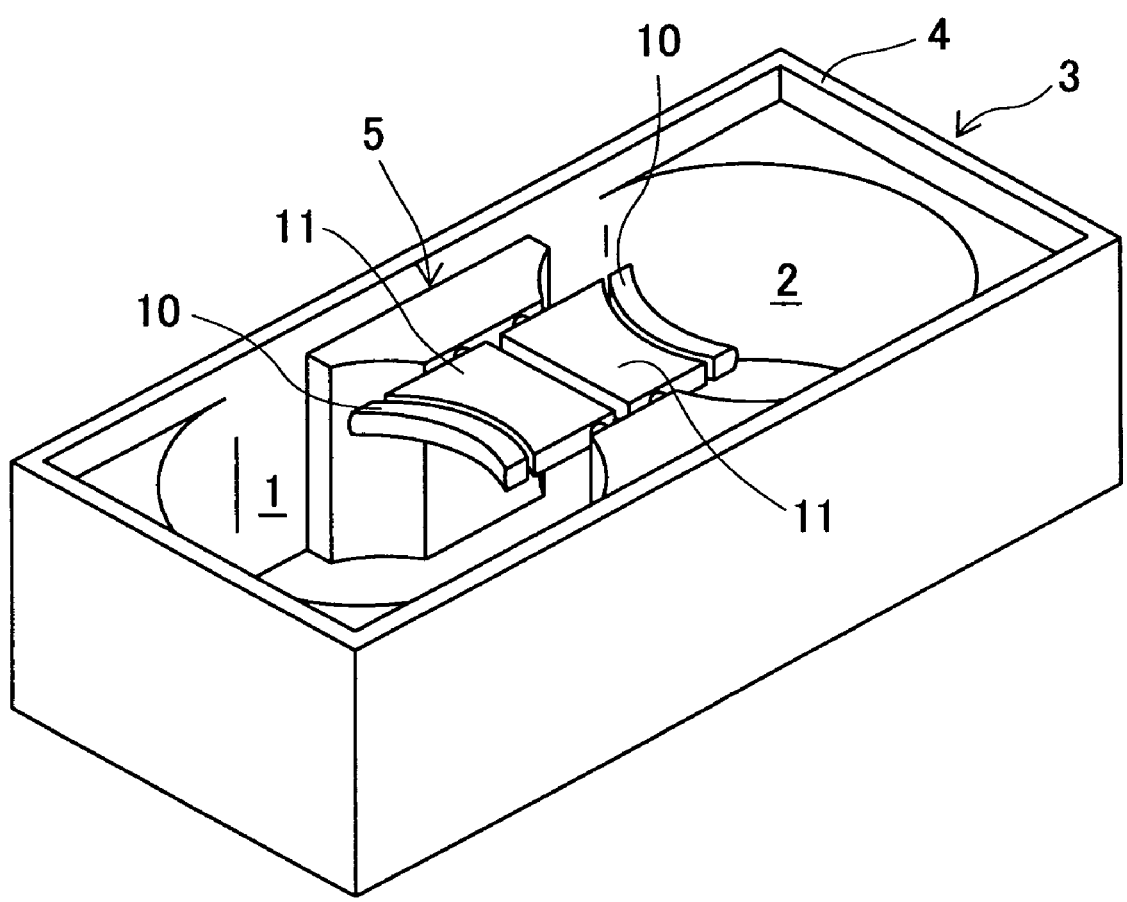
FIG. 1 is a perspective view for illustrating an overall construction of a cup holder according to an example of the present invention.
Figure 2:
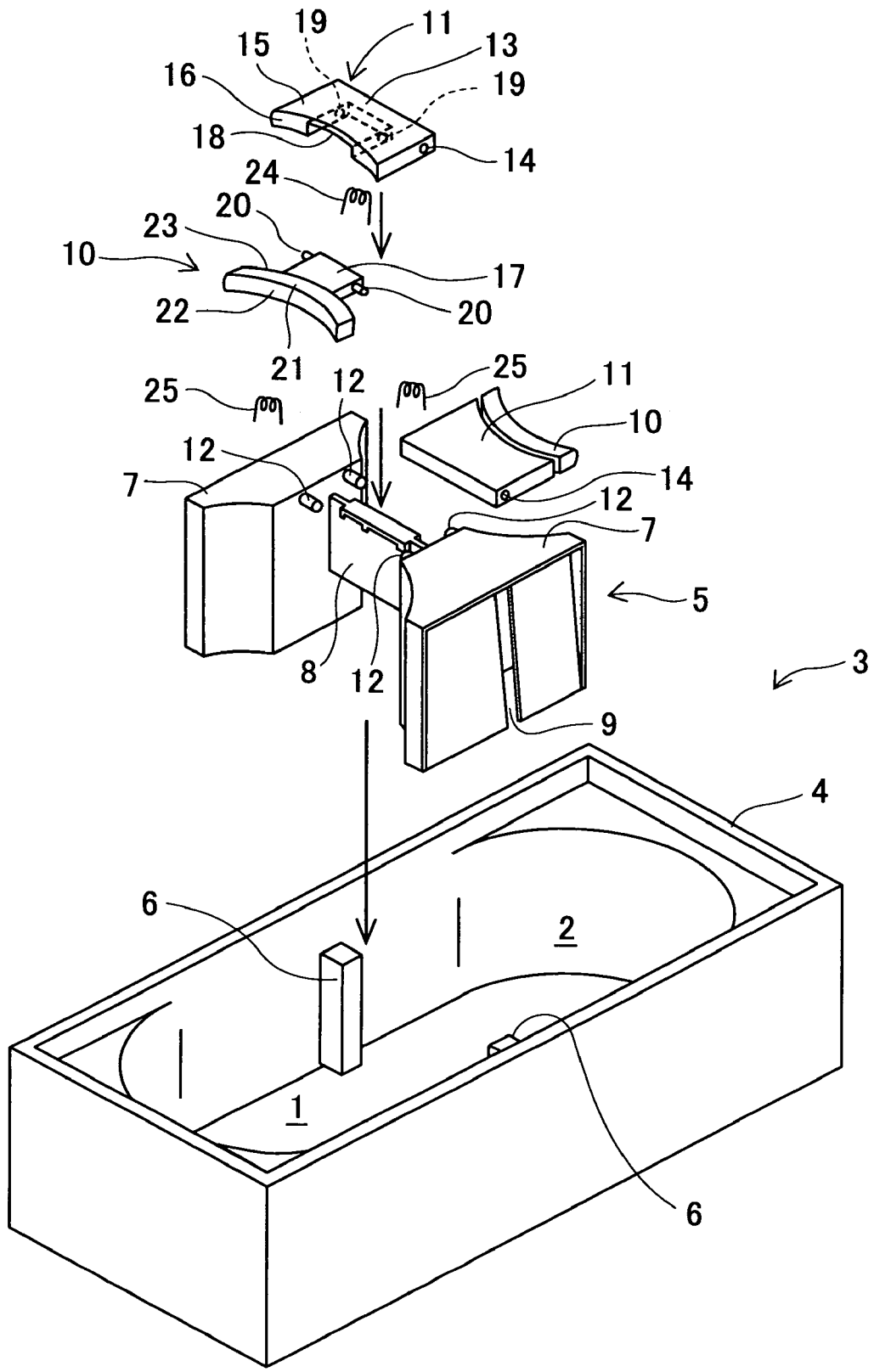
FIG. 2 is an exploded perspective view for illustrating the cup holder according to the example of the present invention.
Figure 3:
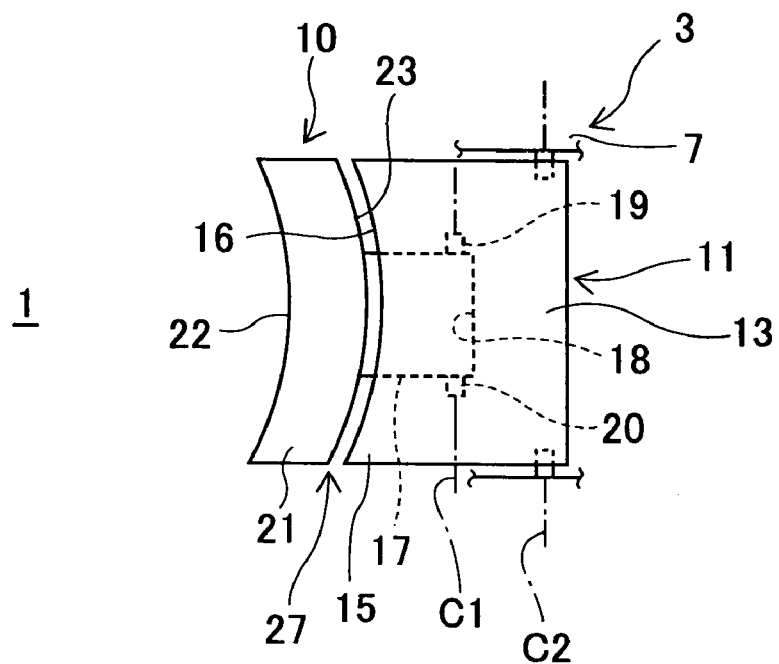
FIG. 3 is a major plan view for illustrating an inner-peripheral-side supporting member and an outer-peripheral-side supporting member of the cup holder according to the example of the present invention.

FIG. 1 is a perspective view for illustrating an overall construction of the present cup holder. FIG. 2 is an exploded perspective view for illustrating the present cup holder. FIG. 3 is a major plan view for illustrating an inner-peripheral-side supporting member and an outer-peripheral-side supporting member of the present cup holder.

As illustrated in FIG. 1, the present cup holder comprises a holder body 3. The holder body 3 has two accommodation portions, a first accommodation portion 1 and a second accommodation portion 2. The holder body 3 comprises a box-shaped body 4, and a stopper member 5. The box-shaped body 4 is formed as a rectangular shape in cross section. The stopper member 5 is accommodated in the box-shaped body 4. As illustrated in FIG. 2, the box-shaped body 4 is provided with paired ribs 6 at the middle in the longitudinal direction.

The stopper member 5 comprises paired side portions 7, and a bridge portion 8. The bridge portion 8 connects the paired side portions 7 to each other. The paired side portions 7 are provided with an engaging groove 9 in the back, respectively. The engaging grooves 9 are capable of engaging with the paired ribs 6 of the holder body 3's box-shaped body 4. When the respective ribs 6 of the box-shaped body 4 engage with the respective engaging grooves 9 of the stopper member 5, which is accommodated in the box-shaped body 4, respectively, the box-shaped body 4 is coupled with the stopper member 5. In the coupled state, the first accommodation portion 1 and the second accommodation portion 2 are formed in the holder body 3. Note that the first accommodation portion 1 and the second accommodation portion 2 can accommodate a major-diameter container "L" whose diameter is large, respectively, as well.

The present cup holder comprises paired inner-peripheral-side supporting members 10, which are disposed right and left, and paired outer-peripheral-side supporting members 11, which are disposed right and left.

Note herein that the cup holder according to the present example is formed as a right/left symmetrical configuration with respect to the central line in the longitudinal direction; and that it is arranged so that the lower-left section and the upper-right section have an identical construction, respectively, in FIG. 1 will be described. Accordingly, in the following description, only the construction of the present cup holder's lower-left section in FIG. 1, construction which corresponds to the first accommodation portion 1 of the holder body 3; but the construction of the present cup holder's upper-right section in FIG. 1 will not be described, construction which corresponds to the second accommodation portion 2 of the holder body 3.

As illustrated in FIG. 2, the stopper member 5 is provided with two paired second boss shafts 12 on the surfaces of the paired side portions 7, surfaces which face to each, respectively. Each pair of the paired second boss shafts 12 is disposed on an imaginary line so as to face to each other, respectively.

The outer-peripheral-side supporting member 11 comprises a base end 13. The base end 13 is provided with paired second pivotally-supporting holes 14 on both of the side surfaces. The paired pivotally-supporting holes 14 are disposed on an imaginary line, and can engage with one of the two paired second boss shafts 12 of the stopper member 5. Moreover, the outer-peripheral-side supporting member 11 further comprises an outer-peripheral-side supporting portion 15, which is disposed at the leading end. The outer-peripheral-side supporting portion 15 has an arc-shaped outer-peripheral-side supporting inner-end surface 16. The arc-shaped outer-peripheral-side supporting inner-end surface 16 conforms to a side-face configuration of an intermediate-diameter container "M" substantially. In addition, the outer-peripheral-side supporting member 11 further comprises an accommodation dent 18, which is provided on the leading-end side in the rear surface. The accommodation dent 18 can accommodate a later-described base end 17 of the inner-peripheral-side supporting member 10. Moreover, the facing opposite surfaces of the accommodating dent 18 are provided with paired first pivotally-supporting holes 19, which are disposed on an imaginary line.

The inner-peripheral-side supporting member 10 comprises a base end 17. The base end 17 is provided with paired first boss shafts 20 on both of the side surfaces. The paired first boss shafts 20 are disposed on an imaginary line, and can engage with the paired pivotally-supporting holes 19 of the outer-peripheral-side supporting member 11. Moreover, the inner-peripheral-side supporting member 10 further comprises an inner-peripheral-side supporting portion 21, which is disposed at the leading end. The inner-peripheral-side supporting portion 21 has an arc-shaped inner-peripheral-side supporting inner-end surface 22, and an arc-shaped outer-end surface 23. The arc-shaped inner-peripheral-side supporting inner-end surface 22 conforms to a side-face configuration of a minor-diameter container "S" substantially. The arc-shaped outer-end surface 23 conforms to the outer-peripheral-side supporting inner-end surface 16 of the outer-peripheral-side supporting member 11 substantially.

Moreover, the inner-peripheral-side supporting member 10's base end 17 is accommodated in the outer-peripheral-side supporting member 11's accommodation dent 18. In addition, the inner-peripheral-side supporting member 10's paired boss shafts 20 are engaged with the outer-peripheral-side supporting members 10's paired first pivotally-supporting holes 19 while interposing a first urging member 24 (or first spring) therebetween. Thus, the inner-peripheral-side supporting member 10 is pivotally supported to the outer-peripheral-side supporting member 11 at the base end 17 while interposing the first urging member 24 therebetween so that the inner-peripheral-side supporting member 10 is disposed rotatably about a first rotary shaft-center "C1," as can be seen from FIG. 3. Note that the inner-peripheral-side supporting member 10 is inhibited from rotating upward beyond the substantially horizontal state (or disposition) because the upper surface of the inner-peripheral-side supporting member 10's base end 17 contacts with the lower surface of the outer-peripheral-side supporting member 11's accommodation dent 18.

In addition, the paired pivotally-supporting holes 14 of the outer-peripheral-side supporting member 11, to which the inner-peripheral-side supporting member 10 is supported pivotally, are engaged with one of the two paired second boss shafts 12 of the stopper member 5's paired side portions 7 while interposing a second urging member 25 (or second spring) therebetween. Thus, the outer-peripheral-side supporting member 11 is pivotally supported to the holder body 3's stopper member 5 at the base end 13 while interposing the second urging member 25 therebetween so that the outer-peripheral-side supporting member 11 is disposed rotatably about a second rotary shaft-center "C2," as can be seen from FIG. 3. Note that the outer-peripheral-side supporting member 11 is inhibited from rotating upward beyond the substantially horizontal disposition by not-shown engaging means.

Thus, the second urging member 25 urges the outer-peripheral-side supporting member 11 upward to a second datum position, at which the outer-peripheral-side supporting member 11's outer-peripheral-side supporting portion 15 protrudes within the holder body 3's first accommodation portion 1 by a predetermined distance, in such a direction that the outer-peripheral-side supporting member 11 protrudes within the first accommodation portion 1; that is, the outer-peripheral-side supporting member 11 is kept in the substantially horizontal disposition. Moreover, the first urging member 24 urges the inner-peripheral-side supporting member 10 upward to a first datum position at which the inner-peripheral-side supporting member 10's inner-peripheral-side supporting portion 21 protrudes within the holder body 3's first accommodation portion 1 by a predetermined distance, in such a direction that the inner-peripheral-side supporting member 10 protrudes within the first accommodation portion 1; that is, the inner-peripheral-side supporting member 10 is kept in the substantially horizontal disposition.

Figure 7:
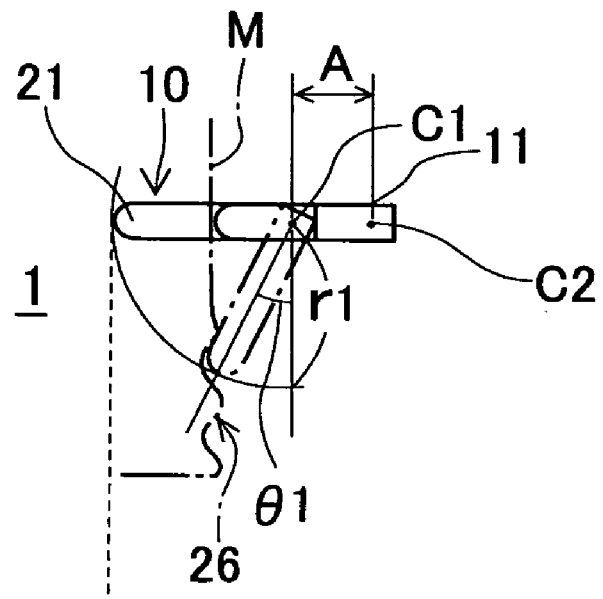
FIG. 7 is a diagram for explaining the operations of the cup holder according to the example of the present invention.

Therefore, as best shown in FIG. 3, in the present cup holder, the inner-peripheral-side supporting portion 21 (specifically, the inner-peripheral-side supporting inner-end surface 22) of the inner-peripheral-side supporting member 10, which is located at the first datum position, is positioned nearer toward the central side (or an imaginary center) of the holder body 3's first accommodation portion 1 than the outer-peripheral-side supporting portion 15 (specifically, the outer-peripheral-side supporting inner-end surface 16) of the outer-peripheral-side supporting member 11, which is located at the second datum position, is positioned. Moreover, the inner-peripheral-side supporting member 10's first rotary shaft-center "C1" is disposed at a position, which is displaced by a predetermined offset distance "A" toward the central side of the holder body 3's first accommodation portion 1 with respect to the outer-peripheral-side supporting member 11's second rotary shaft-center "C2," as can be seen from FIG. 7. In other words, as illustrated in FIG. 7, the first rotary shaft-center "C1" of the inner-peripheral-side supporting member 10, which is located at the first datum position, is set off from the second rotary shaft-center "C2" of the outer-peripheral-side supporting member 11, which is located at the second datum position, by a predetermined offset distance "A" toward the central side of the holder body 3's first accommodation portion 1.

Hereinafter, how the cup holder according to the present example operates will be described with reference to FIGS. 4 through 7.

The cup holder according to the present example can stably hold a minor-diameter container "S," an intermediate-diameter container "M," and a major-diameter container "L." The intermediate-diameter container "M" has a larger outside diameter than that of the minor-diameter container "S." The major-diameter container "L" has a larger outside diameter than that of the intermediate-diameter container "M."

Figure 4:
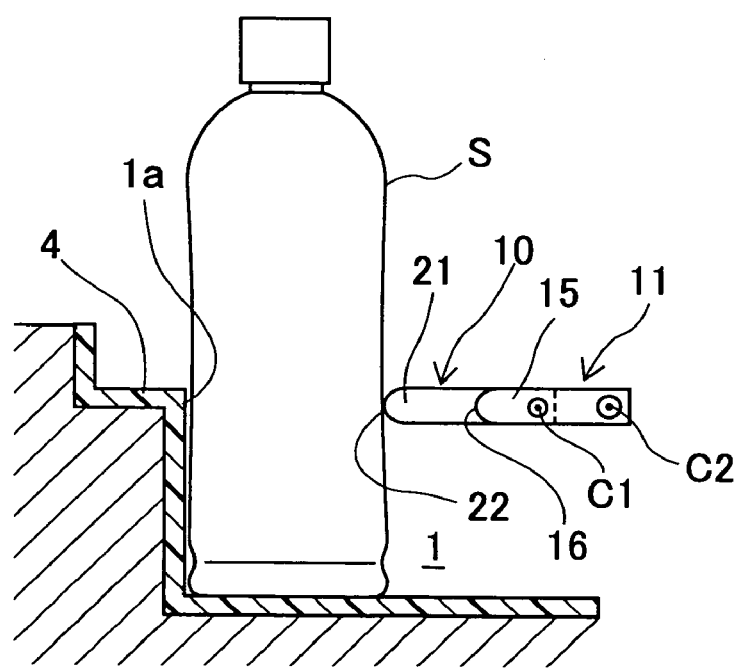
FIG. 4 is a major cross-sectional view for illustrating such an instance that a minor-diameter container "S" is fitted into the cup holder according to the example of the present invention.

When the present cup holder holds the minor-diameter container "S" in the holder body 3's first accommodation portion 1, the inner-peripheral-side supporting member 10 is located at the first datum position. Accordingly, as illustrated in FIG. 4, the inner-peripheral-side supporting inner-end surface 22 of the inner-peripheral-side supporting member 10's inner-peripheral-side supporting portion 21 as a whole substantially, and an inner wall surface 1a of the holder body 3's first accommodation portion 1 contact with an upper side face of the minor-diameter container "S," respectively. Consequently, the present cup holder can stably hold the minor-diameter container "S."

Figure 5:
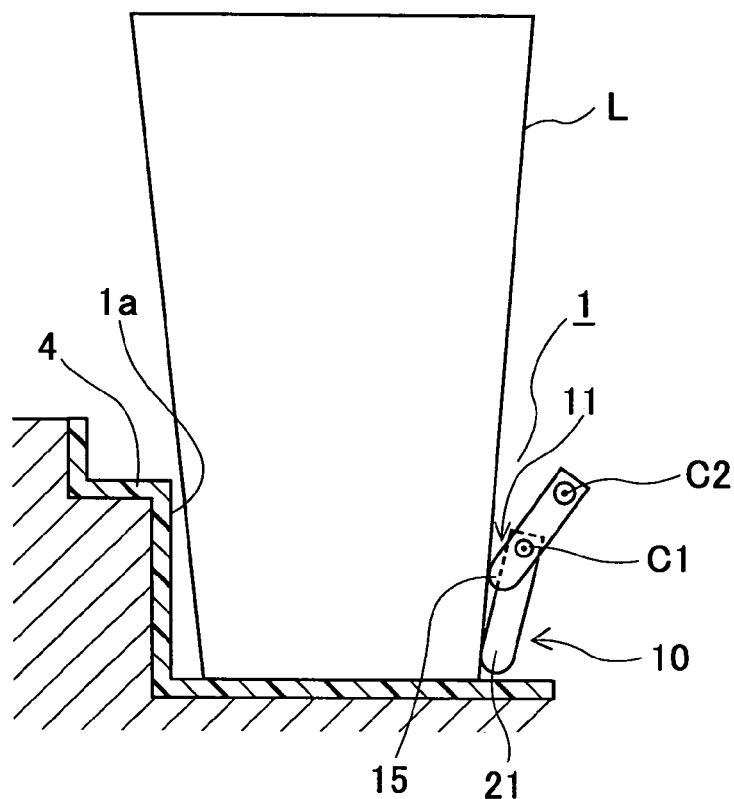
FIG. 5 is a major cross-sectional view for illustrating such an instance that a major-diameter container "L" is fitted into the cup holder according to the example of the present invention.

Moreover, when the present cup holder holds the major-diameter container "L" in the holder body 3's first accommodation portion 1, the inner-peripheral-side supporting member 10 is rotated downward from the first datum position by being pressed with the major-diameter container "L" as the major-diameter container "L" is fitted into the first accommodation portion 1; and the outer-peripheral-side supporting member 11 is rotated downward from the second datum position by being pressed with the major-diameter container "L" as the major-diameter container "L" is fitted into the first accommodation portion 1. Accordingly, as illustrated in FIG. 5, the inner wall surface 1a of the holder body 3's first accommodation portion 1 contacts with an upper side face of the major-diameter container "L," which is fitted into the accommodation portion 1; and additionally the downwardly-rotated inner-peripheral-side supporting member 10's inner-peripheral-side supporting portion 21, and the downwardly-rotated outer-peripheral-side supporting member 11's outer-peripheral-side supporting portion 15 contact with a lower side face of the major-diameter container "L," respectively. Consequently, the present cup holder can stably hold the major-diameter container "L."

Figure 6:
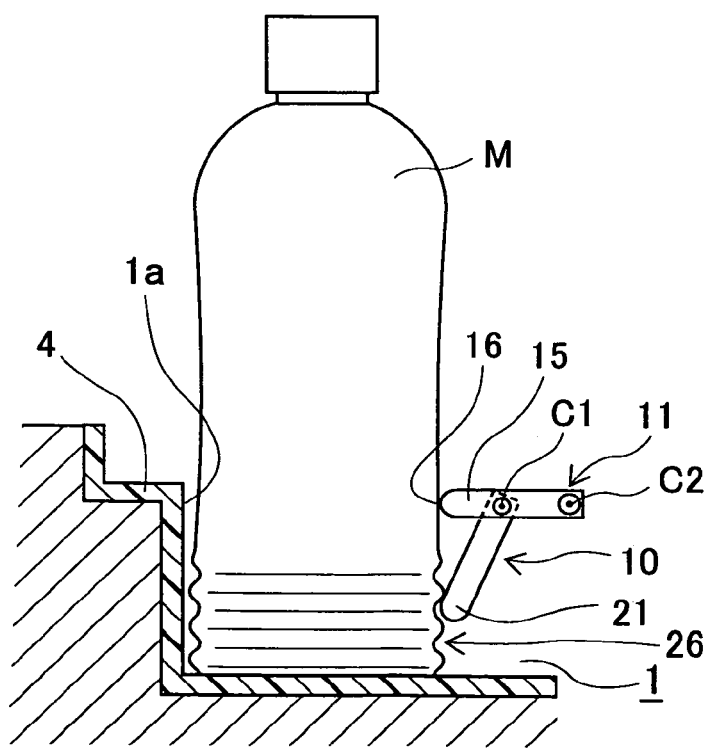
FIG. 6 is a major cross-sectional view for illustrating such an instance that an intermediate-diameter container "M" is fitted into the cup holder according to the example of the present invention.

In addition, when the present cup holder holds the intermediate-diameter container "M" in the holder body 3's first accommodation portion 1, the outer-peripheral-side supporting member 11 is located at the second datum position; and the inner-peripheral-side supporting member 10 is rotated downward from the first datum position by being pressed with the intermediate-diameter container "M" as the intermediate-diameter container "M" is fitted into the first accommodation portion 1. Accordingly, as illustrated in FIG. 6, the outer-peripheral-side supporting inner-end surface 16 of the outer-peripheral-side supporting member 11's outer-peripheral-side supporting portion 15 as a whole substantially, and the inner wall surface 1a of the holder body 3's first accommodation portion 1 contact with an upper side face of the intermediate-diameter container "M," which is fitted into the accommodation portion 1, respectively; and additionally the downwardly-rotated inner-peripheral-side supporting member 10's inner-peripheral-side supporting portion 21 contacts with a lower side face of the intermediate-diameter container "M." Consequently, the present cup holder can stably hold the intermediate-diameter container "M."

Figure 8:
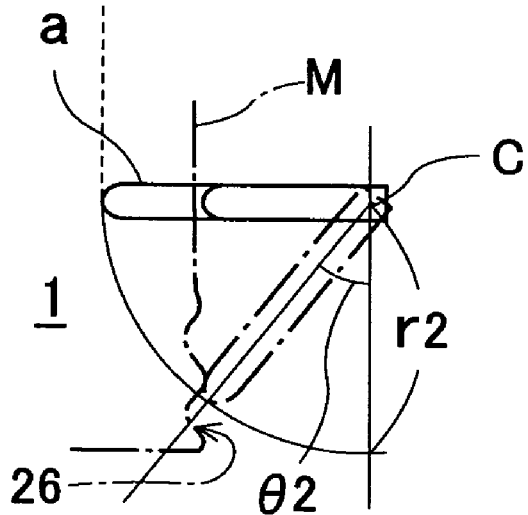
FIG. 8 is a diagram for explaining the operations of a cup holder according to a conventional example.

Note that, in the cup holder according to the present example, the inner-peripheral-side supporting member 10's first rotary shaft-center "C1" is disposed at a position, which is displaced by a predetermined offset distance "A" toward the central side of the holder body 3's first accommodation portion 1 with respect to the outer-peripheral-side supporting member 11's second rotary shaft-center "C2," as can be seen from FIG. 7. On the other hand, the conventional cup holder comprises an outer-peripheral-side supporting member and an inner-peripheral-side supporting member "a," which are disposed rotatably about a shared rotary shaft-center "C," as illustrated in FIG. 8. In other words, the present cup holder comprises the inner-peripheral-side supporting member 10 whose inner-peripheral-side supporting portion 21 is disposed at the same position as the conventional cup holder's inner-peripheral-side supporting member "a" is disposed within the first accommodation portion 1 when the inner-peripheral-side supporting member 10 is located at the first datum position. However, the present cup holder's inner-peripheral-side supporting member 10 has a shorter rotary radius than that of the conventional cup holder's inner-peripheral-side supporting member "a," because the inner-peripheral-side supporting portion 21 (specifically, the inner-peripheral-side supporting inner-end surface 22) is positioned nearer toward the central side of the holder body 3's first accommodation portion 1 than the outer-peripheral-side supporting member 11's outer-peripheral-side supporting portion 15 (specifically, the outer-peripheral-side supporting inner-end surface 16) is positioned. Specifically, when labeling the rotary radius of the inner-peripheral-side supporting member 10 "r1" and the rotary radius of the inner-peripheral-side supporting member "a" "r2," respectively, as designated in FIGS. 7 and 8, they satisfy the inequality, "r1"<"r2."

In particular, in the cup holder of the present example, the intermediate-diameter container "M" presses the inner-peripheral-side supporting member 10 as the intermediate-diameter container "M" is fitted into the holder body 3's accommodation portion 1, and rotates the inner-peripheral-side supporting member 10 downward from the first datum position. Note that, when the inner-peripheral-side supporting member 10 thus rotates, the inner-peripheral-side supporting member 10 rotates by a greater rotary angle than the conventional cup holder's inner-peripheral-side supporting member "a" does; or the inner-peripheral-side supporting member 10's rotary displacement is greater than that of the conventional cup holder's inner-peripheral-side supporting member "a." Accordingly, a relief angle θ, an angle formed between the vertical line passing through the inner-peripheral-side supporting member 10's first rotary shaft-center "C1" and the downwardly-rotated inner-peripheral-side supporting member 10, becomes smaller. That is, when labeling the angle, which is formed between the vertical line passing through the inner-peripheral-side supporting member 10's first rotary shaft-center "C1" and the downwardly-rotated inner-peripheral-side supporting member 10, a relief angle "θ1," and the angle, which is formed between the vertical line passing through the inner-peripheral-side supporting portion "a's" rotary shaft-center "C" and the downwardly-rotated inner-peripheral-side supporting member "a," a relief angle "θ2," respectively, as designated in FIGS. 7 and 8, they satisfy the inequality, "θ1"<"θ2."

Thus, even when the cup holder of the present example holds intermediate-diameter container "M," whose lower portion is provided with peripherally-extending irregularities 26, the inner-peripheral-side supporting member 10 is less likely to get stuck with the irregularities 26. In other words, the irregularities 26 are likely to get away from the inner-peripheral-side supporting member 10. As a result, the present cup holder makes it possible to inhibit the intermediate-diameter container "M" from being less likely to be pulled out of the present cup holder.

The above-described specific arrangement produces the following advantages, specific arrangement that, when the inner-peripheral-side supporting member 10 of the cup holder of the present example is rotated downward from the first datum position as the intermediate-diameter container "M" is fitted into the holder body 3's accommodation portion 1, the inner-side-peripheral-side supporting member 10 rotates by a greater rotary angle than the conventional cup holder's inner-peripheral-side supporting member "a" does, or exhibits a larger rotary displacement. That is, the first urging member 24 exerts a greater spring repulsive force to the inner-peripheral-side supporting member 10, which rotates downward. Consequently, the present cup holder can support the intermediate-diameter container "M" by strongly pressing the lower side face of the intermediate-diameter container "M," which is fitted into the accommodation portion 1, with the inner-peripheral-side supporting member 10, which rotates downward.

Moreover, the cup holder of the present example comprises; the outer-peripheral-side supporting member 11, which is supported pivotally to the holder body 3's stopper member 5 while interposing the second urging member 25 therebetween; and the inner-peripheral-side supporting member 10, which is supported pivotally to the outer-peripheral-supporting member 11 while interposing the first urging member 24 therebetween. Accordingly, the present cup holder can make the urging force (or spring force) of the first urging member 24 and the urging force (or spring force) of the second urging member 25 equal to each other. Consequently, the present cup holder can operate the outer-peripheral-side supporting member 11 with the same load as that for operating inner-peripheral-side supporting member 10.

In addition, the cup holder of the present example comprises the outer-peripheral-side supporting member 11, and the inner-peripheral-side supporting member 10. Moreover, the outer-peripheral-side supporting member 11's outer-peripheral-side supporting portion 15 has the arc-shaped outer-peripheral-side supporting inner-end surface 16; and the inner-peripheral-side supporting member 10's inner-peripheral-side supporting portion 21 has the arc-shaped inner-peripheral-side supporting inner-end surface 22. In addition, the arc-shaped outer-peripheral-side supporting inner-end surface 16 conforms to an outer-peripheral configuration of the intermediate-diameter container "M" substantially; and the arc-shaped inner-peripheral-side supporting inner-end surface 22 conforms to an outer-peripheral configuration of the minor-diameter container "S" substantially. Therefore, when the present cup holder holds the intermediate-diameter container "M," it can support the upper side face of the intermediate-diameter container "M" securely with the outer-peripheral-side supporting portion 15's arc-shaped outer-peripheral-side supporting inner-end surface 16. Moreover, when the present cup holder holds the minor-diameter container, it can support the upper side face of the minor-diameter container "S" securely with the outer-peripheral-side supporting portion 21's arc-shaped inner-peripheral-side supporting inner-end surface 22.

Moreover, the cup holder of the present example comprises the outer-peripheral-side supporting member 11, which further has the accommodation dent 18 being capable of accommodating the inner-peripheral-side supporting member 10's base end 17 therein; and the inner-peripheral-side supporting member 10 whose inner-peripheral-side supporting portion 21 has the arc-shaped outer-end surface 23 conforming to the arc-shaped supporting inner-end surface 16 of the outer-peripheral-side supporting member 11's outer-peripheral-side supporting portion 15. Accordingly, as illustrated in FIG. 3, the present cup holder has the clear-cut arc-shaped boundary line between the outer-peripheral-side supporting member 11 and the inner-peripheral-side supporting member 10. Consequently, the present cup holder exhibits upgraded decorativeness.

All in all, the cup holder according to the present example can stably hold each of the minor-diameter container "S," the intermediate-diameter container "M" and the major-diameter container "L," containers with variously-differing outside diameters. Moreover, even when the present cup holder holds the intermediate-diameter container "M," which is provided with the peripherally-extending irregularities 26 at the lower portion, the inner-peripheral-side supporting member 10 is less likely to get stuck with the irregularities 26, or the irregularities 26 are likely to get away from the inner-peripheral-side supporting member 10. As a result, the present cup folder can inhibit the intermediate-diameter container "M" from being less likely to be pulled out of the present cup holder.

Note that the above-described example is an example in which two members, the box-shaped body 4 and the stopper member 5, make the holder body 3. However, the construction of the holder body 3 is not limited to the construction. For example, the holder body 3 can be constructed so that the box-shaped body 4 and stopper member 5 are formed integrally.

Moreover, in the above-described example, the outer-peripheral-side supporting member 11 is supported pivotally to the holder body 3; and additionally the inner-peripheral-side supporting member 10 is supported pivotally to the outer-peripheral-side supporting member 11. However, as far as the relationship that the first rotary shaft-center "C1" of the inner-peripheral-side supporting member 10, which is located at the first datum position, is disposed at a position, which is displaced by a predetermined offset distance "A" toward the central side of the holder body 3's first accommodation portion 1 with respect to the second rotary shaft-center "C2" of the outer-peripheral-side supporting member 11, which is located at the second datum position, both inner-peripheral-side supporting member 10 and outer-peripheral-side supporting member 11 can be pivotally supported to the holder body 3 as well.

Having now fully described the present invention, it will be apparent to one of ordinary skill in the art that many changes and modifications can be made thereto without departing from the spirit or scope of the present invention as set forth herein including the appended claims.

What is claimed is:

1. A cup holder, comprising:
a holder body having an accommodation portion into which a container is fitted;
an inner-peripheral-side supporting member disposed rotatably within the accommodation portion of the holder body, and having a first rotary shaft-center, a base end, an inner-peripheral-side supporting portion, and a leading end, the base end being supported pivotally so as to be rotatable about the first rotary shaft-center, the inner-peripheral-side supporting portion being capable of supporting a minor-diameter container when contacting with a side face of the minor-diameter container, the leading end being provided with the inner-peripheral-side supporting portion;
a first urging member for urging the inner-peripheral-side supporting member rotatably upward to a first datum position, at which the inner-peripheral-side supporting portion of the inner-peripheral-side supporting member protrudes by a first predetermined magnitude within the accommodation portion of the holder body, in such a direction that the inner-peripheral-side supporting member protrudes within the accommodation portion;
an outer-peripheral-side supporting member disposed rotatably within the accommodation portion of the holder body, and having a second rotary shaft-center, a base end, an outer-peripheral-side supporting portion, and a leading end, the base end being supported pivotally so as to be rotatable about the second rotary shaft-center, the outer-peripheral-side supporting portion being capable of supporting an intermediate-diameter container, whose diameter is larger that of the minor-diameter container, when contacting with a side face of the intermediate-diameter container, the leading end being provided with the outer-peripheral-side supporting portion; and
a second urging member for urging the outer-peripheral-side supporting member rotatably upward to a second datum position, at which the outer-peripheral-side supporting portion of the outer-peripheral-side supporting member protrudes by a second predetermined magnitude within the accommodation portion of the holder body, in such a direction that the outer-peripheral-side supporting member protrudes within the accommodation portion;
the first rotary shaft-center of the inner-peripheral-side supporting member, which is located at the first datum position, being disposed at a position, which is displaced by a predetermined magnitude toward an imaginary center of the accommodation portion of the holder body with respect to the second rotary shaft-center of the outer-peripheral-side supporting member, which is located at the second datum position.

2. The cup holder set forth in claim 1, wherein:
the inner-peripheral-side supporting portion of the inner-peripheral-side supporting member, which is located at the first datum position, is positioned nearer to the imaginary center of the accommodation portion of the holder body than the outer-peripheral-side supporting portion of the outer-peripheral-side supporting member, which is located at the second datum position, is positioned;
when holding the minor-diameter container, the inner-peripheral-side supporting portion of the inner-peripheral-side supporting member, which is located at the first datum position, and an inner wall surface of the accommodation portion of the holder body contact with the side face of the minor-diameter container, which is fitted into the accommodation portion, to support the minor-diameter container; and
when holding the intermediate-diameter container, the inner-peripheral-side supporting member, which is rotated downward from the first datum position by being pressed with the intermediate-diameter container as the intermediate-diameter container is fitted into the accommodation portion of the holder body, the outer-peripheral-side supporting portion of the outer-peripheral-side supporting member, which is located at the second datum position, and the inner wall surface of the accommodation portion of the holder body contact with the side face of the intermediate-diameter container, which is fitted into the accommodation portion, to support the intermediate-diameter container.

3. The cup holder set forth in claim 1, wherein:
the outer-peripheral-side supporting member is supported pivotally to the holder body while interposing the second urging member therebetween; and
the inner-peripheral-side supporting member is supported pivotally to the outer-peripheral-side supporting member while interposing the first urging member therebetween.

4. The cup holder set forth in claim 3, wherein:
the outer-peripheral-side supporting portion of the outer-peripheral-side supporting member has an arc-shaped outer-peripheral-side supporting inner-end surface, which conforms to an outer-peripheral configuration of the intermediate-diameter container substantially;

the inner-peripheral-side supporting portion of the inner-peripheral-side supporting member has an arc-shaped inner-peripheral-side supporting inner-end surface, which conforms to an outer-peripheral configuration of the minor-diameter container substantially, and an arc-shaped outer-end surface, which conforms to the arc-shaped outer-peripheral-side supporting inner-end surface of the outer-peripheral-side supporting portion substantially; and the outer-peripheral-side supporting member further has an accommodation dent, which is capable of accommodating the base end of the inner-peripheral-side supporting member therein.

5. The cup holder set forth in claim 1, wherein:

when holding a major-diameter container, whose diameter is larger than that of the intermediate-diameter container, the inner-peripheral-side supporting member, which is rotated downward from the first datum position by being pressed with the major-diameter container as the major-diameter container is fitted into the accommodation portion of the holder body, the outer-peripheral-side supporting member, which is rotated downward from the second datum position by being pressed with the major-diameter container as the major-diameter container is fitted into the accommodation portion of the holder body, and the inner wall surface of the accommodation portion of the holder body contact with a side face of the major-diameter container, which is fitted into the accommodation portion, to support the major-diameter container.

6. The cup holder set forth in claim 1, wherein:

the first rotary shaft-center of the inner-peripheral-side supporting member, which is located at the first datum position, is set off from the second rotary shaft-center of the outer-peripheral-side supporting member, which is located at the second datum position, by a predetermined offset magnitude toward the imaginary center of the accommodation portion of the holder body.

7. The cup holder set forth in claim 1, wherein:

a first operational force, which is exerted by the first urging member, is equal to a second operational force, which is exerted by the second urging member.

* * * * *